Aug. 1, 1967
W. J. HYNEK ET AL
3,333,280
INTERLINER
Filed July 8, 1964
3 Sheets-Sheet 1
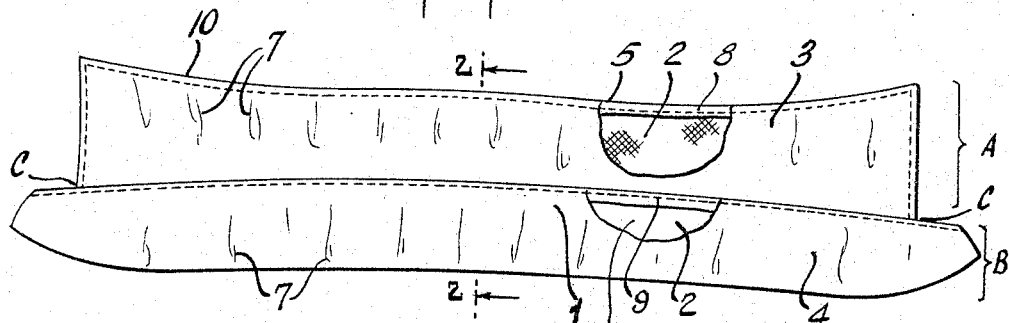
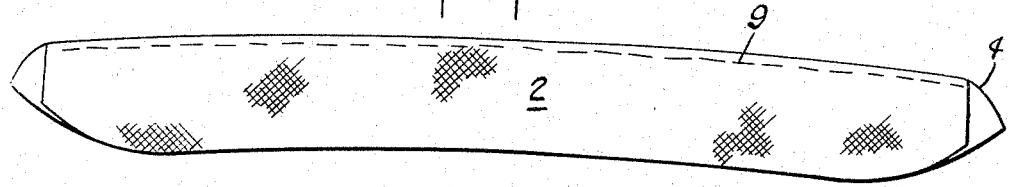
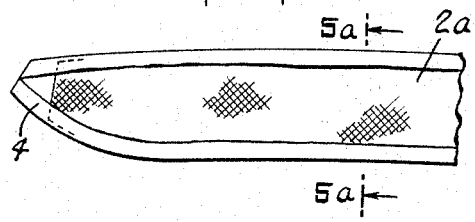
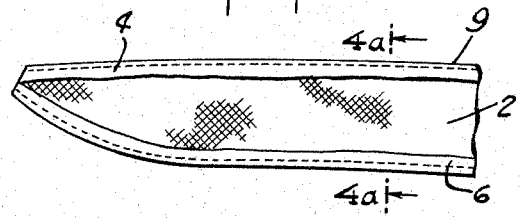
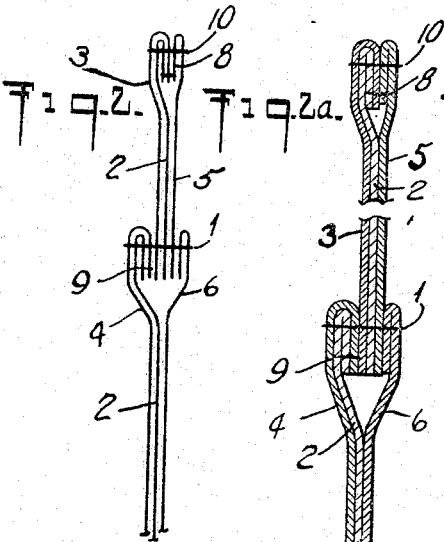
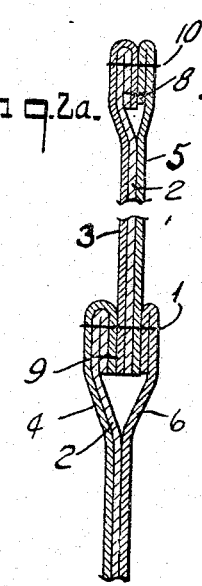
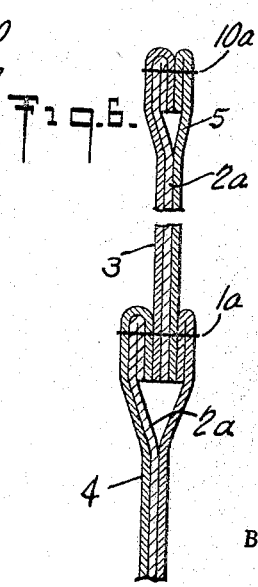
INVENTORS:
WALTER J. HYNEK
WILLIAM M. RUSSELL
BY THOMAS D. AINSLIE
ATTORNEY Aug. 1, 1967
W. J. HYNEK ETAL
3,333,280
INTERLINER
Filed July 8, 1964
3 Sheets-Sheet 2
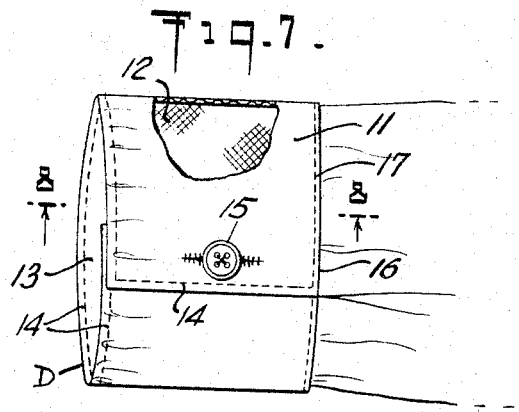
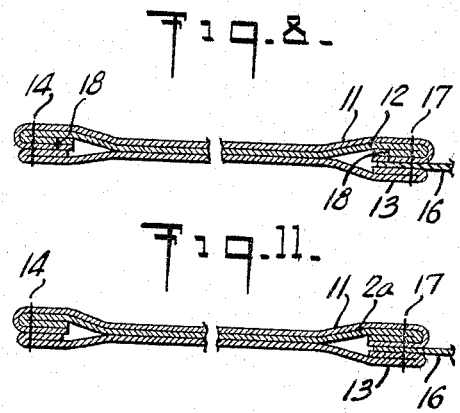
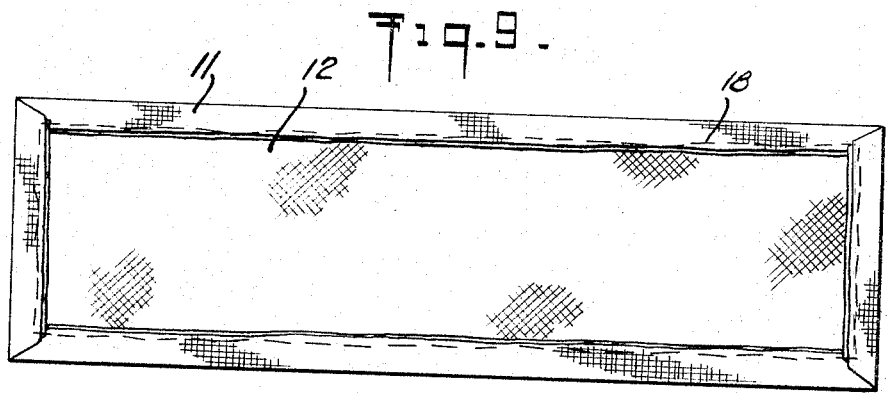
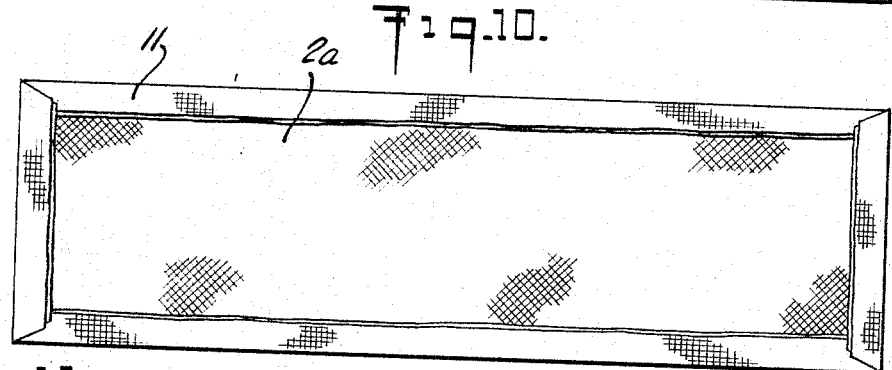
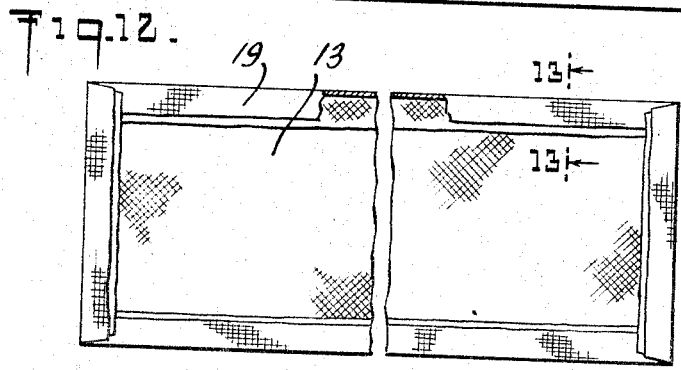
INVENTORS:
WALTER J. HYNEK
WILLIAM M. RUSSELL
BY THOMAS D. AINSLIE
John H. Tregoning
ATTORNEY Aug. 1, 1967
W. J. HYNEK ETAL
INTERLINER
3,333,280
Filed July 8, 1964
3 Sheets-Sheet 3
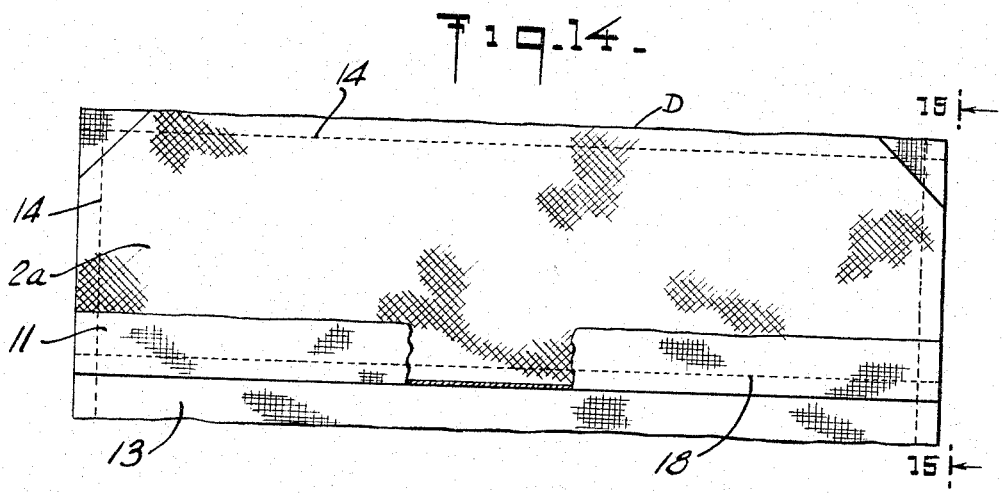
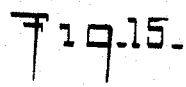
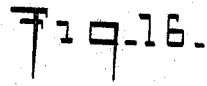
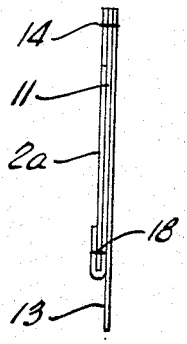
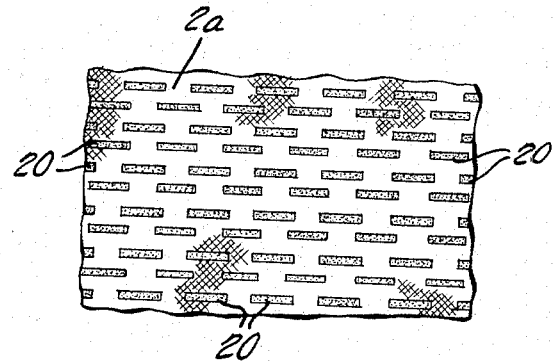
INVENTORS:
WALTER J. HYNEK
WILLIAM M. RUSSELL
BY THOMAS D. AINSLIE
ATTORNEY

United States Patent Office 3,333,280
Patented Aug. 1, 1967

3,333,280
INTERLINER
Walter J. Hynek, Milltown, N.J., William M. Russell, Belchertown, Mass., and Thomas D. Ainslie, Metuchen, N.J., assignors, by direct and mesne assignments, to Johnson & Johnson, a corporation of New Jersey
Filed July 8, 1964, Ser. No. 381,098
7 Claims. (Cl. 2—143)

This invention relates to wearing apparel of the type adapted to be subjected to repeated washings and more particularly to collars and cuffs and the like, to a fabric from which they may be prepared and to improved methods for their preparation.

There are several types of garments which are constructed to withstand repeated washings without losing the essential features that characterize them. This is especially true of shirting and particularly of the cuffs and collars of such shirts. In the manufacture of cuffs and collars and like articles which are required to exhibit certain characteristics that must be preserved after repeated washings, common practice is to insert or interpose an interliner between the two face members of a collar or a cuff. The interliner is usually such that it impart a measure of resilience to the collar and cuff and contributes toward the maintenance of the shape of these and like articles.

The construction of collars and cuffs and like articles which utilize an interliner interposed between facing members, has been characterized by sewing steps which are necessary to insure the retention of the placement of the interliner adjacent to at least one face member during the remainder of the manufacturing process. The retention of the facewise placement is required, in the usual instance, because at least one pair of edges common to both the face member and the interliner may well be folded over to provide an extremity which is to be joined to a similarly folded fabric member and secured together by sewing along the common folded edges to provide a smooth edge, or end, where raveling is precluded. Illustrative examples are collars and cuffs and like articles.

Stitching by itself creates problems in garment construction. It may create fractured fiber or fiber protrusion which weaken wear resistance. Thus the more sewing the more broken fiber ends and the less wear resistance. Sewing may be attended by the utilization of a thread different than that of the material it joins which imparts a shrinkage factor. Of course, it also provides floats, which, combined with the tension imparted to the thread during sewing, have a detrimental effect on the fabric. During washing the thread shrinks, causing contraction of the yarns of the fabric. The greater the shrinkage, the more pronounced is the pulling and lines of puckering or buckling appear. This is intensified by double stitch and/or superimposition of seams in layered fabric construction. The puckering or lines or buckling provide hills of fabric which receive substantially all of the abrasive wear as compared to the valleys, or the rest of the fabric. The life of the fabric is reduced since the forces of wear are concentrated on points of the fabric rather than substantially uniformly received by the fabric. There is also a factor of discomfort which may be provided if the lines or puckering are severe and protrude from a body-contacting face. Additionally, such results distract from the appearance of the fabric if the face having the puckering is exposed and readily apparent.

These and other disadvantages are remedied by this invention which provides an intermediate fabric adapted for use in uniting two layers of textile fabric, said intermediate fabric having a discontinuous surface coating of heat-sealable, removable material whereby temporary adhesive bond sites are provided.

By "removable" is meant that the heat-sealable material may be removed by normal machine washing, dry cleaning and like methods dependent on the solubility of the heat-sealable material used.

The term "intermediate fabric" as used herein is meant to define either a woven or a nonwoven fabric used in the construction of wearing apparel, etc., where the fabric aids in the actual construction by supplying some deficiency or contributing some desired function which simplifies the actual manufacture. Preferably, this term defines a woven or a nonwoven interliner fabric used in the fabrication of wearing apparel and like articles, where the interliner fabric not only facilitates, through this invention, an ease of construction, but also contributes desired properties to the finished article. Thus it is seen that the fabric can perform its temporary function in manufacture and can also remain and contribute to the characteristics of the finished article.

In the manufacture of wearing apparel the use of one embodiment of the intermediate fabric of this invention provides a new process which comprises (a) placing a shaped, first textile fabric in facing relationship to a similarly shaped interliner fabric, said interliner fabric having a discontinuous surface coating of a heat-sealable material which is removable by laundering, (b) folding at least one edge of the interliner, (c) applying heat to said folded edge and to effect temporary bonding between said interliner and said first fabric and to insure the positioning of said interliner, (d) placing a complementary shaped, second textile fabric having at least one edge folded and held in position by holding means, in fold-to-fold facing relationship to said first fabric/interliner, (e) removing said holding means, and (f) securing together said first fabric/interliner and said second fabric by stitching through said folded edge.

More particularly, the production of seamed, multiply textile fabrics such as collars and cuffs is greatly improved by this invention which provides the method which comprises (a) placing a shaped, first textile fabric in facing relationship to a similarly shaped interliner fabric, said interliner having a surface coating of heat-sealable material which is removable by laundering (b) folding at least one edge common to said first fabric and said interliner (c) applying heat to said fold to effect temporary bonding between said interliner and said first fabric to insure the positioning of said fold, (d) placing a complementary shaped, second textile fabric, having at least one edge folded and held in position by holding means, in a fold-to-fold facing relationship to said first fabric/interliner, (e) removing the holding means and (f) securing together said first fabric/interliner and said second fabric by sewing along the common folded edges to provide a seam.

Of course, the interliner may be of woven or nonwoven construction and it may be bleached, dyed or otherwise treated to provide the necessary color and other properties for its inclusion into wearing apparel.

A nonwoven interliner of this invention may be treated to provide it with wash and wear properties, i.e., wet strength, resilience and resistance to abrasion, as well as good hand and color stability. This is not essential; however, it is desirable in many instances depending on the end use contemplated and/or the properties desired in the finished product. Such properties are provided by chemical compositions added to the fabric as a finish or applied as a binder. For example, the wash and wear properties of cotton are due mainly to cross-linking of the long cellulose molecules which make up the fiber to set it into a form which it will retain through the rigors of wear and laundering. Representative of the chemical compositions which can and have been utilized for this purpose are divinyl sulfone, carbamates, formaldehyde derivatives, etc.

A woven interliner of this invention may be either non-resilient or resilient, i.e., possessing wash and wear properties. The non-resilient interliner is usually prepared by applying a starch and a lubricant followed by mechanical compaction for shrinkage control. To a resilient interliner fabric a stiffener, e.g., polyvinyl alcohol, reactive starch, a polyvinyl acetate along with a cellulose cross-linking agent such as dimethylolethylurea, melamine-formaldehyde resins, urea formaldehyde precondensates, dihydroxyethylsulfone, etc., are applied to effect shrinkage and wash and wear performance.

It is essential the heat-sealable composition applied to the surface of the interliner for the purpose of providing temporary bond sites be heat fusible at between about 150° F. and about 450° F. It is also essential that this composition does not provide any undesired properties to the interliner itself or to any fabric to which temporary adherence is desired. Thus, any thermoplastic resin having these characteristics may be used for this purpose in this invention. Examples of such heat-sealable compositions are polyvinyl acetates, polyvinyl alcohols, polyvinyl chlorides, starch ethers, polyacrylate resins, etc. When using a starch ether, it is understood that some moisture is employed in the heat seal operation.

As a practical matter it is essential that the heat-sealable material be removable by washing since its retention is not desired and since laundering the garment in water is the existing method of ridding it of undesired foreign matter. Water remains the most desirable means for removing it, since it could be substantially completely removed in the first washing or two of the garment. Of course, other techniques such as dry cleaning could be used depending on the garment and the solvency of the bonding agent. There is no desire that this heat-sealable bonding agent impart any properties to the fabrics involved and for this reason it must not be one that enters into chemical reaction with the fibers or filaments or the finishing or binding agents to any detrimental effects.

When this heat-sealable bonding agent is a "hard" polymer, it must be such that there results a discontinuous surface coating. By its very nature, a hard thermoplastic resin, in solid form and at room temperature, is a brittle or at least a resilient mass; therefore in a continuous sheet or portion of any dimension applied to a fabric, it must necessarily impart a certain stiffness to the fabric. This stiffness would vary with the thickness and extent of the film, and perhaps with the resin itself. Since the article of wearing apparel for which this invention has been intended is not one such that laundering of the finished article is effected prior to sale, the heat-sealable bonding agent remains on the surface of the interliner until washing is provided and it is removed. Since a "hard polymer" heat-sealable bonding agent could necessarily effect a certain stiffness in the finished article if it were present in continuous surface coating care must be exercised lest it contribute an undesirable stiffness property to the finished article and the consumer would avoid it. There is the added reason that a continuous film would be a little harder to remove by washing and thus any undesirable stiffness might be retained in the finished article of wearing apparel through several washings.

If the temporary bonding agent is composed of what is commonly referred to as a "soft" thermoplastic resin or a "soft polymer" a continuous coating may be applied to one or both surfaces of the interliner since this polymer would not be hard and brittle at room temperature although a degree of both would be in evidence. The type of coating applied to the interliner, continuous or discontinuous, would then depend, at least in part, on the degree of stiffness one would desire to work with and, in turn, on the nature of the polymer used.

The thermoplastic resin which establishes the temporary bonding sites on the fabric must be one that becomes plastic between about 150° F. and about 450° F. since this is the range of temperatures of existing devices which are used by manufacturers to effect a heat seal.

It is of equal importance that the temporary bonding agent be applied such as to provide surface bonding sites. This means that the amount of this heat-sealable bonding agent entering the fabric must be kept to a minimum. Thus the method of applying this bonding agent and its viscosity are of paramount importance.

In constructing the interliner of this invention it is only necessary that a sheet-like fabric or web be constructed of either individualized fibers or filaments or a combination of these which may be either natural or synthetic in origin. The sheet is then bonded by either chemical or mechanical means although the former is preferred. If a chemical composition is chosen to provide the necessary bonding, it may also be selected for dual characteristics since it may also impart the usually desired wash and wear properties; however, additional treatment may be desired to provide any such desired characteristics to the sheet or web. The wash water removable thermoplastic material which is to provide the temporary bonding sites on the surface of the fabric is then applied to at least one surface of the fabric to effect a plurality of individual surface bonding sites which are plasticized at a temperature from about 150° F. to about 450° F.

The heat-seal composition may be applied to the fabric by a fluid spray method, by a method whereby a dispersion of particles of the heat-seal material in a liquid carrier is deposited on the surface of the fabric and the carrier removed or by a rotogravure coating technique.

In the deposition-from-dispersion method it is critical that the solids of heat-sealable composition be small enough to stay suspended yet coarse enough to effect a discontinuous surface coating. Therefore the solids must have a particle size which passes through a #30 screen (openings of 0.0232 inch) and are retained by a #70 screen (openings of 0.0083 inch), both screens U.S. Standard Sieve numbers.

In the liquid deposition method it is essential that the liquid have a viscosity between about 250 c.p.s. (centipoises per second) and about 500 c.p.s. as measured on an LVF Brookfield viscosimeter at 30 r.p.m. with a #2 spindle to insure that the particles remain uniformly dispersed in the liquid phase and not settle out. On application to the web by the liquid dispersion method, a uniform discontinuous surface coating is established by the filtering action of the web which absorbs the liquid phase of the system within itself, leaving the dispersed granules uniformly positioned on one of its surfaces. The bond sites developed then protrude from the surface of the interliner fabric to permit sufficient contact between these sites and the fabric that they are to temporarily adhere to, such that on application of the required heat, bond sites of sufficient contact area and of sufficient contact material will insure that the bonding is of sufficient strength to be useful.

If a fluid spray method is employed and if the fluid is water, it is realized that when the spray is effected some of the water is atomized and coagulation results therefore entry into the interliner of the heat-sealable material is precluded and surface coating results. A system where dry granules of the heat-sealable material are shaken or otherwise deposited on the surface of the interliner and then caused to adhere to the fabric by application of heat is also possible.

In manufacturing a nonwoven interliner as defined by this invention; individualized fibers of either synthetic or natural origin, or both, may be utilized in forming a web of intermingled and interwoven individualized fibers. Preferably a combination of individualized fibers constituting about 35% nylon and about 65% rayon are used. The nylon fibers impart resiliency and tear resistance and the rayon provides softness and an economic filler to the web. These factors must be considered desirable constituents and the above percentages take advantage of the desirable properties of both fibers without suffering from overindulgence of either. Other synthetic fibers can be substituted in varying desirable percentages or used in total, e.g. polyvinyl alcohol, polyesters, polyacrylonitriles, polyamides, etc., so long as they have the desirable tenacity. This is also true of the natural fibers.

In this instance since rayon fibers are used, stabilization of the rayon must be accomplished to make its wet properties similar to its dry properties, i.e. to insure maximum dimensional stability when it is wet. This can be accomplished by the addition of formaldehyde or certain formaldehyde compounds to cross-link the rayon fibers. A suitable bonding agent is then added to bond the whole system. Representative of such bonding agents are self-cross-linking polyvinyl acetates, also polyvinyl chloride (not self-cross-linking). In many instances the bonding agent is chosen such as to impart desirable wash and wear properties to the fabric. Examples of these are acrylics, cross-linked polyvinyl acetate and cross-linked polyvinyl alcohols, among others known to the art. Discoloration is an important factor to be considered here; therefore, other bonding agents which would otherwise be suitable are discarded, e.g. synthetic rubbers. The binders are chosen to give resilience, tear resistance, and a good hand to the fabric. Wash and wear properties may also be desired.

After drying at suitable temperatures the heat-seal material is applied to the web. This is preferably accomplished by forcing the heat-seal material in granule form and in a fluid medium against at least one surface of the web to provide a discontinuous surface coating or by rotogravure process whereby etched or imprinted rollers holding a viscous fluid dispersion of heat-seal material is made to contact at least one face of the web to imprint or impart the aforementioned plurality of temporary bonding sites of heat-seal material. While there is no strict requirement other than that the surface coating have sufficient bond sites to perform the desired bonding function, it is preferred that the plurality of bond sites cover an area of approximately from about 10% to about 100% surface coverage with 50% to 75% being preferred. This will vary depending on the method of deposition and whether or not a continuous coating is desired due to the nature of the resin. The individual surface coating areas of heat-sealable material may take any desired form. They may be rectangular, square, round, doughnut shaped, etc., or they may have an irregular shape.

In summary, the method for providing an interliner fabric having a plurality of temporary bond sites of heat-sealable material comprises (a) formation of bonded layer of fibers (b) causing the formation of a discontinuous surface coating of temporary bond sites of heat-sealable water-soluble material on at least one face of said fabric to provide an interliner adapted to adhesively join at least one other textile fabric. The formation of the bond sites may be accomplished by a fluid spray of heat-sealable material, by deposition from a liquid dispersion or by the rotogravure process. Wash and wear properties can also be imparted.

As stated earlier, in the construction of wearing apparel where interliners are desired to provide areas of resiliency which retain a preconceived shape or design, it has been necessary to stitch the interliner to a facing sheet by sewing at least along one common edge. If folded edges are desired to preclude raveling, said edges may be first folded and then sewn as before. When the interliner/face fabric composite so joined are then joined to another face fabric or the like, as for example in collar and cuff construction, where the interliner becomes the intermediate layer in the resultant sandwich, additional edge stitching is required to secure the sandwich of fabrics in position. Thus, at least along one edge of the finished article there is superimposed stitching which is conducive to the formation of lines of puckering along the face of the cuff or collar at substantially right angles to the seam.

The instant invention eliminates the stitching of the interliner to a face fabric to hold it in juxtaposed position or to insure the retention of folds and in addition insures uniform folding and stitching because machine methods may be utilized. Also, lines of puckering along a face of a cuff or a collar or like article caused by superimposed stitching is greatly reduced or eliminated altogether.

The present invention would be more readily understood from the following description, when read in conjunction with the accompanying drawings, in which:

FIGURE 1 is a plan view of a shirt collar of the prior art.

FIG. 2 and FIG. 2a are cross-sections taken along line 2—2 of FIG. 1.

FIG. 3 depicts an interliner cut to size and sewn together with the top ply fabric to form a basis for the neckband construction.

FIG. 4 is a plan view of the two-ply structure of FIG. 3 wherein the opposite longitudinal edge of the neckband has been sewn to the interliner and both of these sewn edges have been folded over onto the neckband.

FIG. 5 is a plan view of the neckband of FIG. 4; however, this embodiment has the instant invention incorporated therein, as is readily apparent.

FIG. 4a and FIG. 5a are sections taken along lines 4a—4a of FIG. 4 and 5a—5a of FIG. 5 respectively.

FIG. 6 depicts a cross-section of a collar and neckband having the benefits of the instant invention incorporated therein.

FIG. 7 is a plan view of a normal shirt cuff with a section cutaway to show the interliner.

FIG. 8 is a section taken along line 8—8 of FIG. 7.

FIG. 9 depicts the interliner sewn to the face ply of a cuff and folded, while FIG. 10 depicts the face ply/interliner construction of the instant invention.

FIG. 11 is a section which could be taken along a line 2—2 of a collar similar to that of FIG. 7, if it had the instant invention incorporated therein.

FIG. 12 shows the underply of the cuff material held in a folded position.

FIG. 13 is a section taken along line 13—13 of FIG. 12.

FIG. 14 is a plan view of the construction of the cuff in accordance with this invention and shows the face and underplies plus the interliner.

FIG. 15 is a section taken along line 15—15 of FIG. 14.

FIG. 16 is a portion of interliner fabric constructed in accordance with this invention.

In FIGURE 1 the collar section A and the neckband section B are shown joined by stitching 1. Cutaway portions in each of the respective sections show interliner fabric 2 stitched to the face ply 3 of the collar section A and interliner fabric 2 stitched to the face ply 4 of the neckband section B. The collar section A is made up of three plies wherein the interliner 2 is the intermediate. The face ply 3 is the ply that is exposed when the collar is folded down along line C—C and the underply 5 of the collar is the ply that is normally not exposed because of the folding, but forms the other face of the collar. Just a portion of the collar underply 5 can be seen in the cutaway as it is stitched to, and folded over, interliner 2. The face ply 4 of the neckband is the ply that touches the wearer's neck where the underply 6 forms the opposite face and is shown in the cutaway stitched to, and folded over, the interliner 2 of the neckband. The multitude of lines of puckering 7 are shown in both the face ply 3 of the collar and the face ply 4 of the neckband. The collar/neckband combination of FIG. 1 is one that is representative of constructions made and known to the prior art.

FIG. 2 is a cross-section taken along line 2—2 of FIG. 1 with the various plies shown simply by a line. The internal stitching of interliner 2 to the face ply 3 of the collar section A is shown as is the stitching 10 along the entire edge of the collar. Similarly the internal stitching 9, affixing the face ply 4 of the neckband to the interliner 2 is shown as the stitching 1 which joins the neckband section B to the collar section A. FIG. 2a is the same as FIG. 2 except that each ply is given substance.

FIG. 3 shows the face ply 4 of the neckband B, stitched 9 to the interliner 2 in accordance with prior art practice and teaching. Such stitching is accomplished by a hand-guided machine. Because of the tension imparted to the thread by the sewing machine as well as the hand guidance, the stitching is other than uniform. Note should be taken that stitching 9 along the center of the longitudinal edge is just barely on the face ply.

FIG. 4 depicts the face ply/interliner of FIG. 3 except that the other longitudinal edge of the face ply 4 has been stitched to the interliner 2 and both longitudinal edges have been folded over preparatory to joining the underply of the neckband. This operation is termed a "run stitch" by the prior art and is a mandatory step that has been eliminated by this invention. Once again the unevenness of the stitching 9 as well as the unevenness of the fold of each of the longitudinal edges should be noted.

FIG. 4a is a section taken along line 4a—4a of FIG. 4 and shows how the folded/sewn longitudinal edges of the face ply/interliner of FIG. 4 flare out or open since the fold represents an unnatural position which imparts stresses and strains to the fabric. When a fabric consisting of a plurality of superimposed plies is folded over on itself there is a resistance to fold exhibited by all plies and a tendency to return to a more natural position; however, each of the plies, with the exception of the first, must be folded over another and stresses and strains are imparted to each of these plies in order to have the common edges of the plies meet. Each succeeding ply must then be folded over one more of its member plies and it is soon very evident that the ends of all plies will not join along a common line. Furthermore there is a natural desire for each of the edges parallel to the line of fold to creep back toward the line of fold in order to relieve these stresses. This action is in evidence in the manufacture of collars and cuffs where several superimposed edges are folded over on themselves and stitched. In the first place, there has been no method known, other than stitching, to hold the folded edges down in the folded position to preclude the opening up of the fold (FIG. 4a), nor has there been any way to prevent the creeping of the edge of the other ply back toward the line of the fold. Stitching did not prevent the latter since the thread only held the fabric at a point and, even then, the thread did not hold the fabric tightly since the fabric is porous. The creeping back of the fabric effects a looseness in the upper plies of the folded fabrics and contributes to the buckling or puckering that is in evidence in cuffs and collars made with prior art interliners and processes. The instant invention eliminates these disadvantages since the plies of the fabric are held firmly together prior to folding by the adhesive heat-seal bond sites of the interliner and, with folding, all of the edges of both plies of fabric remain in contact along their respective common edge lines and no creeping back of the individual plies is in evidence.

FIG. 5 depicts a face ply/interliner structure similar to that of FIG. 4; however, the interliner fabric 2a of the instant invention has been used (see FIG. 16). The folds of the longitudinal edges are uniform throughout and no stitching is necessary since the temporary bond sites 20 of the interliner 2a have been utilized to cause the face ply 4 to adhere to the interliner fabric 2a of the instant invention. The folding of the longitudinal edges has also been enhanced by the utilization of the bond sites 20 of the interliner, since the interliner fabric 2a has been made to temporarily adhere to itself at these sites to insure a complete fold where the folded edges hug the body of the face ply/interliner structure. The cross-section taken along line 5a—5a is given in FIG. 5a and the advantages of the instant invention are readily apparent.

FIG. 6 is a cross-section which could be taken along a line similar to 2—2 of FIG. 1, if the collar/neckband combination of FIG. 1 had utilized the interliner fabric 2a of this invention. Note that the only stitching that appears is external stitching 10a along the edge of the collar (same as stitching 10 of FIG. 1) and evternal stitching 1a to join the collar and the neckband. There is no internal stitching.

FIG. 7 shows a cuff of a construction common to the prior art. The top ply 11 of the cuff is cutaway to show the interliner fabric 12. The underply 13 of the cuff, the top ply 11 and the interliner fabric 2 are joined together by external stitching 14. A button 15 is sewn to the cuff and the cuff is seen as joined to the sleeve 16 of the shirt by stitching 17.

In accordance with the preceding discussion relative to collar/neckband construction, FIG. 8 is a section taken along line 8—8 of FIG. 7 and shows internal stitching 18 where the top ply 11 of the cuff had to be joined to the interliner 12 during construction to insure the production of the cuff. The external stitching 14 joining the three plies of the cuff at the extremity forming the end of the cuff nearest the hand of the wearer is shown, as is the stitching 17 joining the cuff to the sleeve 16. FIG. 9 shows the top ply/interliner construction presently used by the prior art in the cuff of FIG. 7. The top ply 11 of cuff fabric is shown stitched 18 to interliner 12 along all four edges and all four edges of the composite are seen folded over the interliner material 12. The stitching and the folds are purposely shown as being uneven since both are performed, at least in part, by other than hand machine methods and uniformity is not the rule.

Utilizing the interliner 2a (see FIG. 16) of this invention, a top ply/interliner constructiton shown in FIG. 10 results where no sewing is involved and the top ply fabric 11 adheres to the interliner 2a by the temporary bond sites 20 provided on the interliner 2a. These same bond sites 20 cause the interliner to adhere to itself whereby machine procedure can be utilized to effect the uniform fold where the folded edge does not flare away from the body of the structure (see FIGS. 4a and 5a). Had the top ply/interliner of FIG. 10 been used in construction, a cuff similar to that shown in FIG. 7, a cross-section taken along line 8—8 would reveal that no internal stitching was necessary.

In order to complete the understanding of the cuff construction, FIG. 12 has been inserted to show how the underply 13 of the cuff is placed on stiff paper 19 whereby the edges can be folded and the fold will substantially remain, thus holding the underply in position for joining to the top ply/interliner combination of FIG. 9 or FIG. 10. FIG. 13 is a cross-section taken along line 13—13 of FIG. 12. FIG. 14 depicts the top ply/interliner of FIG. 10 joined by stitching to the underply 13 of FIG. 12 according to the practice of the prior art. These two members are joined with the faces which will be the exposed faces of the top ply 11 and the underply 13, facing one another. Accordingly the cuff must be jammed on a "spade," i.e. a holder which has substantially the same dimensions of the cuff, such that the top edge D of this cuff may be forced inside to reverse the faces. The edge D is then reversed and is held in a taut posititon to provide a uniform common edge line between the top and bottom plies of the cuff. (In so doing, the internal stitching 14 is exposed to wear and a weak area in the cuff is brought into being.) The cuff is then stitched again along edge D to hold the edges of the cuff in position.

As can now be appreciated, the internal stitchings 14 and 18 have been eliminated by reason of the instant invention. Also there is no need to construct the cuff by placing the two eventually exposed faces contiguous to one another since the cuff material can now be folded and held firmly in position.

FIG. 15 is a cross-section taken along line 15—15 of FIG. 14.

FIG. 16 is a section taken from the interliner 2a of this invention. The interliner is shown of woven construction; however, this is not essential and it is easily constructed of individual fibers to effect a nonwoven interliner fabric. In any event, the interliner of this embodiment of the invention is cause to bear discontinuous bond sites 20 of a chemical composition chosen in accordance with the teaching of this invention. The bond sites 20 are heat-sealable and provide sites which effect temporary adhesion between the interliner 2a and another fabric or between the interliner and a portion of the same interliner folded over itself. The bonding material is launderable and is therefore easily dissolved to remove these sites 20.

In actual operation new methods are provided hereby for producing cuffs, collars and the like articles utilizing interliners of this invention whereby an improved product is effected. This is accomplished without several of the prior art sewing steps and the resulting stitching which is detrimental to the finished product. For example, in a neckband similar to that shown in FIG. 1 utilizing the interliner 2a of this invention, it is only necessary to place in facing relationship, the face ply 4 and the interliner 2a, cut as shown in FIG. 3. The longitudinal edges of both the interliner 2a and the face ply are then folded over the body of the interliner and heat is applied to produce adhesion between the various bond sites 20 of the interliner and/or between the interliner 2a and the bond sites 20. The underply 6 of the neckband is then placed on a stiff piece of paper and folded similar to that shown and described with reference to the underply 13 of the cuff (see FIGS. 12 and 13). The paper holds a crease in the underply 6 since, absent the presence of the paper, creasing of the underply 6 without using some foreign material to hold the crease in position would be ineffectual. The lengthwise end of the collar section A which is to be attached to the neckband section B is then inserted between the folded face ply/interliner and the underply 6, the paper is removed from the underply 6 and the sections are joined by stitching 1a (see FIG. 6). The collar section A may be constructed in like manner.

A cuff is constructed in accordance with this invention by a procedure very similar to that used in constructing a neckband or collar when the interliner 2a of this invention is utilized. In this construction it is first necessary to position the interliner 2a in facewise relationship with the top ply 11 of the cuff and then fold all four edges of the composite and heal seal to provide adhesion at the bond sites 20 on the interliner 2a (see FIG. 16). A top ply/interliner similar to that of FIG. 10 is produced. Then the underply 13 of the cuff is positioned on a stiff material, e.g. stiff paper 19, and all four edges are folded inwardly as is shown in FIG. 12. Thus the folds of the underply 13 are preserved. The underply and the top ply/interliner are joined (after the paper 19 is removed from the appropriate edges of the underply) by stitching 14 which joins the three plies of the cuff along one longitudinal edge and two lateral edges as is shown in FIG. 7 and FIG. 11. The one remaining longitudinal edge of both the top ply/interliner and the underply/paper which remains unfastened, is secured by appropriate stitching 17 when the sleeve 16 is inserted between the two.

In both of the constructions outlined above and in others, the bond sites and the bonding material are removed on normal washing of the finished article.

The following nonlimiting examples are given to illustrate one portion of the instant invention.

Example 1

A nonwoven heat-seal interlining is produced by first preparing a web of a blend of individualized fibers consisting of 65% rayon staple fibers and 35% nylon staple fibers, measured in terms of the weight of the total fiber content of the web. This mixture of fibers is fed into a random web-forming unit which makes the isotropic fibrous web. The web is prebonded in a saturator with Elvanol 72–60 a polyvinyl alcohol solution sold by E. I. du Pont de Nemours & Company which after drying at 250° F. results in a dry solids add-on of alcohol of 10 grains per square yard. The web is subsequently bonded with HA–8 (a self-cross-linking acrylic sold by Rohm & Haas). A methylolated alkyl urea formaldehyde resin such as Rhonite R–1 (sold by Rohm & Haas) is included in the padder whereby internal cross-linking of the rayon and resultant stabilization is provided. The prebonded web picks up 200% of the dry fiber weight of the HA–8/R$_r$–1 formulation, which is in the bath at 23% solids. This results in a 43% dry binder solids add-on based on the dry fiber weight.

A discontinuous surface coating of water-soluble, heat-sealable resin is added to the surfaces of the finished base web as an after treatment. Using a No. 30–RO–RS rotogravure roll (manufactured by Eastern Engraving Company), sufficient heat-sealable resin, i.e. Resyn 32–0201, a polyvinyl acetate copolymer emulsion manufactured by National Starch Company at 55% solids, is applied so that after drying there is 100 grains per square yard. The #30 roll contains cells which are truncated pyramids in form, each 0.009 inch deep. The heat-sealable composition has a pH of approximately 4.0 and a viscosity of 2400 c.p.s., as measured on a LVF-Brookfield instrument using the #3 spindle at 60 r.p.m. The resin is, of course, removable by laundering. After coating the fabric is passed to an inclined conveyor and to a dry can stack and into a serpentine wrap about the cans. The cans operate at approximately 220° F. and the softening point of the resin must be slightly higher than this temperature. The fabric is chilled to set the thermoplastic and preclude blocking and it is batched and put back through the process so as to coat the other side of the fabric.

The finished interliner has dimensional stability, resiliency, good color stability and has good wash and wear characteristics. The interliner has a good hand and has not become stiffened to any appreciable degree by the addition of the discontinuous coating of heat-sealable material.

Example 2

A web is prepared, prebonded with alcohol and dried as in Example 1. To the padder mix of HA–8/R–1 formulation, is added to a level of ½% of the wet weight of the binder, a dispersing agent Tamol 850, a sodium salt of carboxylated polyelectrolyte which is sold by Rohm & Haas as a 30% active solution. Also added, is Aquaprint gray 3B, a gray pigment sold by Interchemical Corporation and Aquablack K, a carbon black sold by Columbian Carbon Company, to a level to impart the proper charcoal gray color. Admixed with the binder formulation to a level of 10% of the binder mix wet weight is Gelva V–100, a homopolymer polyvinyl acetate granule, sold by Shawinigan Resin Corporation. The granules are of a size which will pass through a #30 and be retained on a #70 U.S. Standard Sieve screen. The viscosity of the mix is adjusted to 250 to 500 c.p.s. as measured on an LVF-Brookfield instrument using the #2 spindle at 30 r.p.m. The prebonded web is passed through the padder which applies this formulation to the same level as shown in Example 1. Simultaneously with the application of the binder solids, sufficient granules are applied to one side of the fabric to cause an increase in the dry weight of 125 grains per square yard. The bonded and coated fabric is then dried and cured as in Example 1. The finished interlining has dimensional stability, resiliency, good color stability, good wash and wear characteristics, and a wash water removable, latently heat-sealable surface.

*Example 3*

A woven substrate is prepared from a bleached cotton fabric measuring 4.25 yards per pound of a 44 x 40 count in a 40 inch width. The fabric is treated by padding on a mixture to provide wash and wear and shrinkage resistant properties. This mixture comprises 76 grams of vat pigment dyestuff, 240 pounds of a reactive starch, 300 pounds of Permafresh 197 (cellulose cross-linking agent sold by Warwick Chemical) and 75 pounds of magnesium chloride hexahydrate (50% solution) and water to total 240 gallons. The wet pick-up is adjustably controlled to approximately 100% of the weight of the cellulosic textile material. The fabric is framed in a clip tenter frame to the original dry dimension and dried at a temperature of 250° F. for about 5 minutes. Curing is accomplished at 325° F. for about 2½ minutes. The treated fabric is then washed lightly in water containing a detergent and a mild alkali to remove the catalyst and any unreacted formal. The material is again dried.

The heat-sealable finish is applied using a Binks 8-gun, rotary spray system in tandem with a tenter frame. Two passes are made through the unit—one to coat each side of the wash and wear interliner fabric. The heat-sealable finish is made by adding 10 pounds of wood pulp inert extender to 500 pounds of Resyn 25–2243, a polyvinyl acetate copolymer sold by National Starch Company. The heat-seal resin is sprayed on in a uniform coating of discrete particles so that after drying at 250° F. the resin solids amount to 25% of the dry base weight of the substrate. The treated fabric was tested in a Reece folding machine operated at 240° F. with a two second dwell time at 65 pounds per square inch gauge pressure wherein it was joined with a Spresso broadcloth. The treated fabrics performed well in that they held the broadcloth in position for stitching. The heat-seal finish did not contribute adverse hand to the finished cuff and, on the first laundering after shirt fabrication, the heat-seal resin was removed from the shirt.

*Example 4*

A 4200 Shapewell W–R fabric, a woven interliner manufactured by Chicopee Manufacturing Company, is coated on both sides with a fluid mixture of heat-sealable material using a Binks hand spray unit, Model 62, with an air pressure of 40 pounds and a fluid pressure of 20 pounds. The mixture contained 71% water, 25% Resyn 22–2243, an internally plasticized polyvinyl acetate emulsion of 55% solids sold by National Starch Company and 4% Cab-O-Sil (M–5), pyrogenic silica, 0.015 micron particle size sold by Cabot Corporation. This mixture is prepared by dispersing the Cab-O-Sil in approximately one-half of the available water followed by the slow addition of the remaining water and the Resyn 25–2243 accompanied by mild agitation. The interliner is dried to remove the water.

The dry add-on was approximately 12.5% on each side based on the original interlining fabric weight. Substantially no penetration into the interliner by the heat-sealable material is in evidence. Heat sealing of the interliner material with a wash-wear broadcloth is effected at 290° F. after two seconds and at 320° F. after two seconds. Excellent performance in accordance with this invention was in evidence.

It is apparent that many widely different embodiments of this invention may be made without departing from the spirit and scope thereof, and, therefore, it is not intended to be limited except as indicated in the appended claims.

What is claimed is:

1. The method of cuff construction which comprises:
  (a) placing a pre-cut, rectangular, face-ply cuff fabric and a similarly cut interliner in face-wise engagement, said interliner having a temporary surface coating of heat-sealable material which is removable by laundering,
  (b) folding the four edges of said face-ply and interliner and applying heat to effect temporary bonding between said interliner and said face-ply fabric and to insure the positioning of said folds,
  (c) placing a conforming pre-cut, rectangular, underply fabric, having all four edges folded over and held by a holding member, in facing fold-to-fold position with said face-ply and interliner composite,
  (d) removing said holding member, and
  (e) securing together the face-ply and interliner composite and the underply along at least three of the common edges.

2. The method of collar neckband construction which comprises:
  (a) placing a pre-cut, rectangular, top-ply neckband fabric and a similarly cut interliner in facewise engagement, said interliner having a temporary surface coating of heat-sealable material which is removable by laundering,
  (b) folding the two longitudinal edges of said top-ply and interliner and applying heat to effect temporary bonding between said interliner and said top-ply fabric and to insure the positioning of said folds,
  (c) placing a conforming, pre-cut rectangular fabric, having all four edges folded and held by a holding member, in facing fold-to-fold position with said top-ply and interliner composite,
  (d) interposing the unsewn edge of a collar section between the set of folded edges of said top-ply and interliner and said underply,
  (e) securing together the top-ply and interliner, the collar section and the underply.

3. The method of preparing a seamed, multiply textile fabric which comprises:
  (a) placing a shaped, first textile fabric in facing relationship to a similarly shaped interliner fabric, said interliner having a temporary surface coating of heat-sealable material which is removable by laundering,
  (b) folding at least one of the common edges of said first fabric and said interliner and applying heat to said folds to effect temporary bonding between said interliner and said first fabric and to insure the positioning of said folds,
  (c) placing a complementary shaped, second textile fabric, having at least one edge, folded and held in position by holding means, in fold-to-fold facing relationship to said first fabric and interliner composite,
  (d) removing the holding means, and
  (e) securing together said first fabric and interliner and said second fabric by sewing along at least one set of common edges to provide a seam.

4. An intermediate collar fabric having improved resistance to buckling comprising a substantially rectangular web of textile fibers treated with a wash and wear finish material and having a temporary surface coating of heat-sealable material removable by laundering, and a substantially rectangular collar fabric temporarily adhered to said interliner by said heat-sealable material such that at least one of the longitudinal edges and the two lateral edges of both said collar fabric and said interliner are aligned, said aligned edges being inturned and firmly held in said inturned position by said interliner to provide contiguous fold lines and uniformly folded edges positioned to receive stitching.

5. A soft, flexible shirt collar having a top portion and a neckband portion, each of said portions being defined by an interliner fabric enclosed between two face member fabrics, said face members being adhered to said interliner by laundering-removable, heat-sealable bond sites coated on said interliner, the outer edges of said top face members and the top attaching edge of said neckband portion being inturned and firmly held in position by said interliner to insure contiguous fold line adherence and continuous aligned edge positioning between said face members and said interliner, and a single line of stitching securing together said inturned edges to provide a shirt collar devoid of internal stitching and characterized by having improved resistance to buckling and puckering.

6. An intermediate shirt cuff fabric comprising a rectangular web of textile fibers treated with a wash and wear finish material and having a temporary discontinuous surface coating of a heat-sealable material removable by laundering and one ply of a rectangular textile fabric temporarily adhered to said interliner by said heat-sealable material such that at least one longitudinal edge and both lateral edges of said web and at least one longitudinal edge and both lateral edges of said textile fabric are aligned, said aligned edges of said web and said fabric being inturned and firmly held in said inturned position by said interliner whereby fold lines and folded edges of said web and said fabric are in contact to provide a uniformly folded edge adapted to receive stitching whereby a shirt cuff devoid of internal stitching and characterized by substantially improved resistance to buckling and puckering is provided.

7. A soft, flexible rectangular shirt cuff having two rectangular face member fabrics with a rectangular interliner fabric interposed therebetween, said face members being adhered to said interliner by laundering-removable, heat-sealable bond sites secured to said interliner, the edges of said face members and said interliner being inturned and firmly held in position by said interliner to insure contiguous fold line adherence and continuing aligned edge positioning between said interliner and said face members, and a single line of stitching securing together said inturned edges to provide a shirt cuff devoid of internal stitching and characterized by having improved resistance to buckling and puckering.

References Cited

UNITED STATES PATENTS

| | | |
|---|---|---|
| 1,831,403 | 11/1931 | Woodward. |
| 2,020,070 | 11/1935 | Liebowitz _____ 2—123 X |
| 2,299,982 | 10/1942 | Harrison _____ 2—123 X |
| 2,435,509 | 2/1948 | Pfeffer et al. _____ 2—231 |
| 2,467,438 | 4/1949 | McBurney _____ 2—143 |
| 2,489,466 | 11/1949 | Schramm _____ 2—243 X |
| 2,657,159 | 10/1953 | Nahman _____ 2—243 X |
| 2,719,803 | 10/1955 | Nottebohn. |
| 2,744,844 | 5/1956 | Wood et al. _____ 2—274 X |
| 2,994,885 | 8/1961 | Simpson _____ 2—123 |

FOREIGN PATENTS 768,385  2/1957  Great Britain.

JORDAN FRANKLIN, *Primary Examiner.*

J. R. BOLER, *Assistant Examiner.*

UNITED STATES PATENT OFFICE
CERTIFICATE OF CORRECTION

Patent No. 3,333,280                          August 1, 1967

Walter J. Hynek et al.

It is hereby certified that error appears in the above numbered patent requiring correction and that the said Letters Patent should read as corrected below.

Column 8, line 9, for "evternal" read -- external --; column 11, line 50, for "22-2243" read -- 25-2243 --; column 13, line 6 and lines 22 and 23, and column 14, lines 7 and 8, strike out "devoid of internal stitching and characterized by", each occurrence; column 14, after line 25, insert the following reference:

757,517     9/1956     Great Britain

Signed and sealed this 25th day of June 1968.

(SEAL)
Attest:

Edward M. Fletcher, Jr.                              EDWARD J. BRENNER
Attesting Officer                                         Commissioner of Patents